(No Model.)
E. OLIVERA Y MARTINEZ.
CANE PLANTER.
No. 513,807. Patented Jan. 30, 1894.
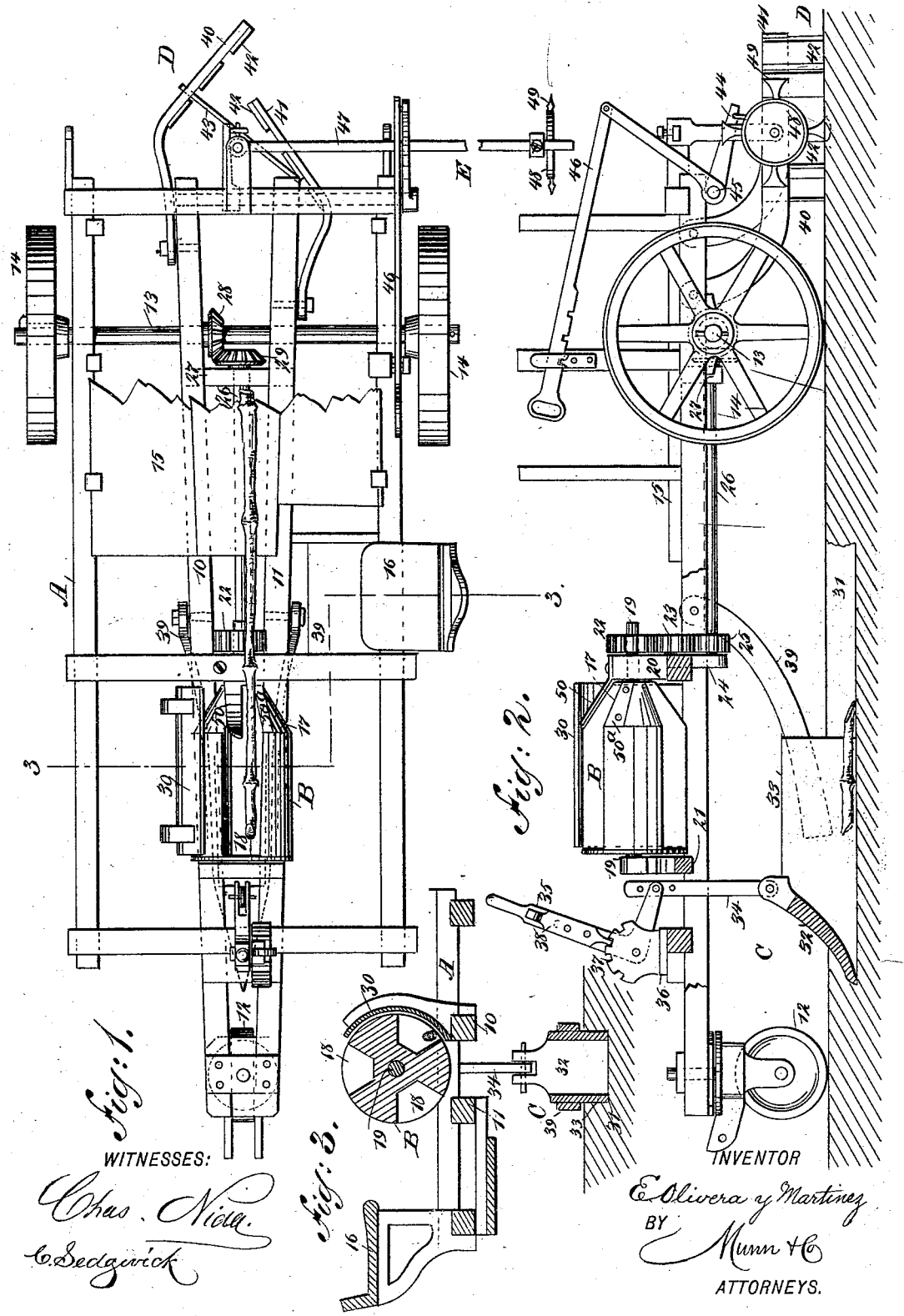
WITNESSES:
Chas. Nida.
C. Sedgwick
INVENTOR
E. Olivera y Martinez
BY
Munn & Co
ATTORNEYS.

UNITED STATES PATENT OFFICE.

ELIGIO OLIVERA Y MARTINEZ, OF HAVANA, CUBA, ASSIGNOR OF ONE-HALF TO EDWARDO M. ACEVEDO, OF SAME PLACE.

CANE-PLANTER.

SPECIFICATION forming part of Letters Patent No. 513,807, dated January 30, 1894.

Application filed February 4, 1893. Serial No. 461,023. (No model.)

*To all whom it may concern:*

Be it known that I, ELIGIO OLIVERA Y MARTINEZ, of Havana, Cuba, have invented a new and Improved Cane-Planter, of which the following is a full, clear, and exact description.

My invention relates to an improvement in cane planters, and has for its object to provide a machine which will be exceedingly simple, durable and economic, capable of cutting the cane in suitable lengths for planting as fast as the cane can be fed to the cutters, and deposit the cut cane in furrows prepared to receive it while the machine is advancing.

A further object of the invention is to provide a marker for the machine capable of being carried in direction of either side of the machine, a covering device whereby the furrow, after it receives the cane, will be closed, and also a means for operating the cutters and planting cylinders automatically while the machine is traveling over the ground.

The invention consists in the novel construction and combination of the several parts, as will be hereinafter fully set forth and pointed out in the claims.

Reference is to be had to the accompanying drawings forming a part of this specification, in which similar figures and letters of reference indicate corresponding parts, in all the views.

Figure 1 is a plan view of the machine. Fig. 2 is a side elevation thereof, the plow and a portion of the frame adjacent to the frame being in section; and Fig. 3 is a transverse section taken practically on the line 3—3 of Fig. 1.

In carrying out the invention a body frame A, is provided of any desired length and width. Ordinarily this frame is of rectangular construction, comprising side beams, front and rear beams and intermediate cross beams, together with two longitudinal yet spaced central beams 10 and 11, the latter beams extending from the rear end of the main frame beyond its forward end; and at the forward end of the two central beams a caster wheel 12 is located.

In addition to the caster wheel 12 the frame is supported upon an axle 13, and the axle has mounted securely upon it two supporting wheels 14, the axle being located near the rear portion of the frame.

Over that portion of the frame above the axle, or more properly speaking, at the rear portion of the frame, a platform 15, is erected, upon which the cane to be cut and planted is placed; and at one side of the machine adjacent to its platform a seat 16, is securely attached to the frame, upon which the operator may be seated.

The planter B, is located above the central beams 10 and 11 in advance of the seat 16 and platform 15. The planter is of peculiar construction and is of cylindrical shape, as shown in the cross section in Fig. 3; but at its rear end the planter is conical, as shown at 17 in Figs. 1 and 2. Thus the device B may be properly termed the planting cylinder or cylinder planter. The cylinder has produced in its exterior surface any desired number of longitudinal pockets 18. Ordinarily, however, three pockets are employed, as shown in Fig. 3, and the pockets are somewhat V-shaped in cross section and extend entirely through the conical end of the cylinder, but not through its forward or square end. The pockets are made only of sufficient length to receive a joint of cane and a sufficient length at each side of the joint to constitute a seed.

The planting cylinder is provided with trunnions 19, and these trunnions are provided with suitable bearings 20 and 21 located upon the frame, and the cylinder is preferably revolved by placing upon its rear trunnion a gear 22, meshing with a gear 23, journaled upon a hanger 24, extending downward from the frame; and the gear 23 meshes with a gear 25, fast upon a line shaft 26, the shaft being located beneath the frame, one end being journaled in the hanger 24 and the other in a box 27, located beneath the frame in front of the axle 13. The line shaft receives motion from the axle, as the axle is provided with a beveled gear 28, which meshes with a like gear 29, fast upon the rear end of the line shaft.

The planting cylinder is surrounded upon one side, preferably the left-hand side, by a semi-circular casing or shell or casing 30, the casing being supported upon the frame, while

the cylinder through which the pockets extend for cutting the cane into suitable lengths after it has been inserted in the pockets and as the cylinder revolves, substantially as described.

2. In a cane planter, the combination of a revolving seed box having a conical end and provided with longitudinal pockets, and a knife extending over the conical end of the seed box, substantially as described.

3. In a cane planter, the combination, with a revolving seed box provided with a series of pockets in its exterior surface, one end of the box being conical or beveled, of a shield located opposite one side of the box, and a stationary knife extending over the conical or tapering end of the box, as and for the purpose set forth.

4. In a cane planter the combination, with a revolving seed box having a tapering or beveled surface at one end and provided with pockets produced longitudinally and exteriorly therein, the said pockets extending through the conical end, of a shield located at one side of the box, and a stationary knife extending over the tapering end of the box, whereby the pockets as the box is revolved are brought beneath the knife, as and for the purpose specified.

5. In a cane planter, the combination, with a revolving cylinder having a conical end provided with exterior pockets, and a shield located adjacent to one side of the cylinder, of a knife held stationary and extending over the conical end of the cylinder as the latter is revolved, and a plow located beneath the cylinder, the said plow being provided with side fenders extending rearwardly from the share, as and for the purpose set forth.

6. In a cane planter, the combination, with a revolving seed box having a conical end provided with exterior pockets produced therein, a shield located at one side of the box, and a stationary knife extending over the conical end of the box, of a plow located beneath the cylinder, comprising a share and fenders projected rearwardly from each side of the share, the pockets in the seed box being adapted to drop their contents between the fenders of the plow, and a covering device located at the rear of the seed box and following the path of the plow, as and for the purpose specified.

7. In a planter, a covering device, the same consisting of two beams having their inner ends connected with a planter and their outer ends carried one in advance of the other, the outer ends of the beams being also at angles to each other, and covering boards connected with the beams, as and for the purpose set forth.

8. In a cane planter, the combination of a revolving planting cylinder having longitudinal pockets extending through one end of the cylinder, a knife for cutting the cane inserted in the pockets into suitable lengths, a plow below the planting cylinder and comprising a share, and wings or fenders projecting rearwardly from the share, and means for raising and lowering the plow, substantially as described.

9. In a cane machine, the combination with the frame, of the covering beams 40 and 41 pivoted to the frame and extending an unequal distance rearwardly, the outer ends of the beams being bent inward toward each other so as to stand at about right angles to each other, the link 43 connecting the said beams, and means connected with the link for raising and lowering the said beams, substantially as described.

ELIGIO OLIVERA Y MARTINEZ.

Witnesses:
ERNESTO LE TOSCA,
JORYES ALBERTUN.